United States Patent [19]

Eriksson

[11] Patent Number: 4,650,352
[45] Date of Patent: Mar. 17, 1987

[54] APPARATUS FOR PERFORMING RAISED DOT FORMATIONS

[76] Inventor: Bror A. Eriksson, Skattkarrsvagen 36, S-650 10 Karlstad, Sweden

[21] Appl. No.: 796,022
[22] PCT Filed: Feb. 15, 1985
[86] PCT No.: PCT/SE85/00076
  § 371 Date: Oct. 3, 1985
  § 102(e) Date: Oct. 3, 1985
[87] PCT Pub. No.: WO85/03794
  PCT Pub. Date: Aug. 29, 1985

[30] Foreign Application Priority Data

Feb. 20, 1984 [SE] Sweden .................. 8400899

[51] Int. Cl.[4] .............................. B41J 3/32
[52] U.S. Cl. .................... 400/122; 434/113; 434/114
[58] Field of Search ................ 400/122; 434/113, 114

[56] References Cited

U.S. PATENT DOCUMENTS

| 2,521,338 | 9/1950 | Bryce et al. | 434/114 |
| 2,891,324 | 6/1959 | Zuk | 434/114 |
| 3,624,772 | 11/1971 | Grunwald | 400/122 |
| 3,736,672 | 6/1973 | Skewis et al. | 434/114 |
| 4,463,676 | 8/1984 | Harada et al. | 400/121 |
| 4,500,293 | 2/1985 | Eltgen | 434/114 |
| 4,551,102 | 11/1985 | Meinzer | 400/122 |

FOREIGN PATENT DOCUMENTS

| 3035852 | 5/1982 | Fed. Rep. of Germany | 400/122 |
| 3134356 | 3/1983 | Fed. Rep. of Germany | |
| 2494469 | 5/1982 | France | |
| 32995 | 2/1982 | Japan | 400/122 |

OTHER PUBLICATIONS

Abstracts of DE3134356 & FR2494469 (data base generated).
Nassimbene, "Ball & Belt ... Display" IBM Technical Disclosure Bulletin, vol. 18, No. 7, pp. 2294-2295, 12/75.
Pike, "Piezoelectric Braille Module", IBM Technical Disclosure Bulletin, vol. 19, No. 4, pp. 1433-1434, 9/76.
Tophin, "Braille Display", IBM Technical Disclosure Bulletin, vol. 19, No. 7, pp. 2565-2566, 12/76.

Primary Examiner—William Pieprz
Attorney, Agent, or Firm—Cushman, Darby & Cushman

[57] ABSTRACT

Readable Braille dot matrix formations are easily formed and utilized to print Braille books and the like. A belt forms an endless loop and has a number of small holes each for receiving a ball. An upper horizontal or slightly inclined path of the belt is supported by and drawn in contact with an underlying support. The belt has a smaller thickness than the diameter of the balls, and the uppermost parts of the balls extend above the upper face of the belt so that they may be tactilly perceived. Empty belt holes are filled with balls at a first area of the belt along its path, and some of the balls are selectively removed from the belt holes at another, second area along the looped path. Selective removal of the balls may be provided by disposing slots in the underlying support with piezoelectric bars providing movable obstacles in the slots. Alternatively electromagnets disposed above the balls may be provided.

9 Claims, 5 Drawing Figures

APPARATUS FOR PERFORMING RAISED DOT FORMATIONS

The invention relates to an apparatus for performing raised dot formations, said apparatus comprising a running belt forming an endless loop and having a great number of holes adapted to receive balls therein. Particularly said dot formations are meant to represent symbols of the Braille-code type readable to people with visual defects.

Books suitable for reading by blind people generally consist of pages of stiff paper material wherein the Braille symbols are formed by raised dots or embossments grouped in matrices of 2×3. The absence of one or more of the six dots in the matrix makes the symbols distinguishable and each representative of the corresponding alpha-numerical character. Such books are hard to manufacture and expensive, and are also bulky and difficult to handle.

The object of the invention is to replace such permanent registration of literature or the like by a running and temporary exposition of successive small parts of the matter in question and to make said exposition readable to people with visual defects.

In an apparatus of the above-mentioned kind the object of the invention is reached in principle by filling a great number of holes in the running endless belt with balls, sorting-out certain balls in a group of holes at a sorting station so as to form a Braille symbol of dots represented by balls extending above the upper face of the belt, reading-off the symbol by tactile perception at an exposition area and then erasing the symbol by filling all holes anew with balls for the next turn of the belt. The essential characterizing features of the apparatus according to the invention are set forth in the following claims.

The invention will now be more closely described with reference to the accompanying drawings, in which FIGS. 1-3 refer to a first embodiment of the apparatus according to the invention.

Figure 1:
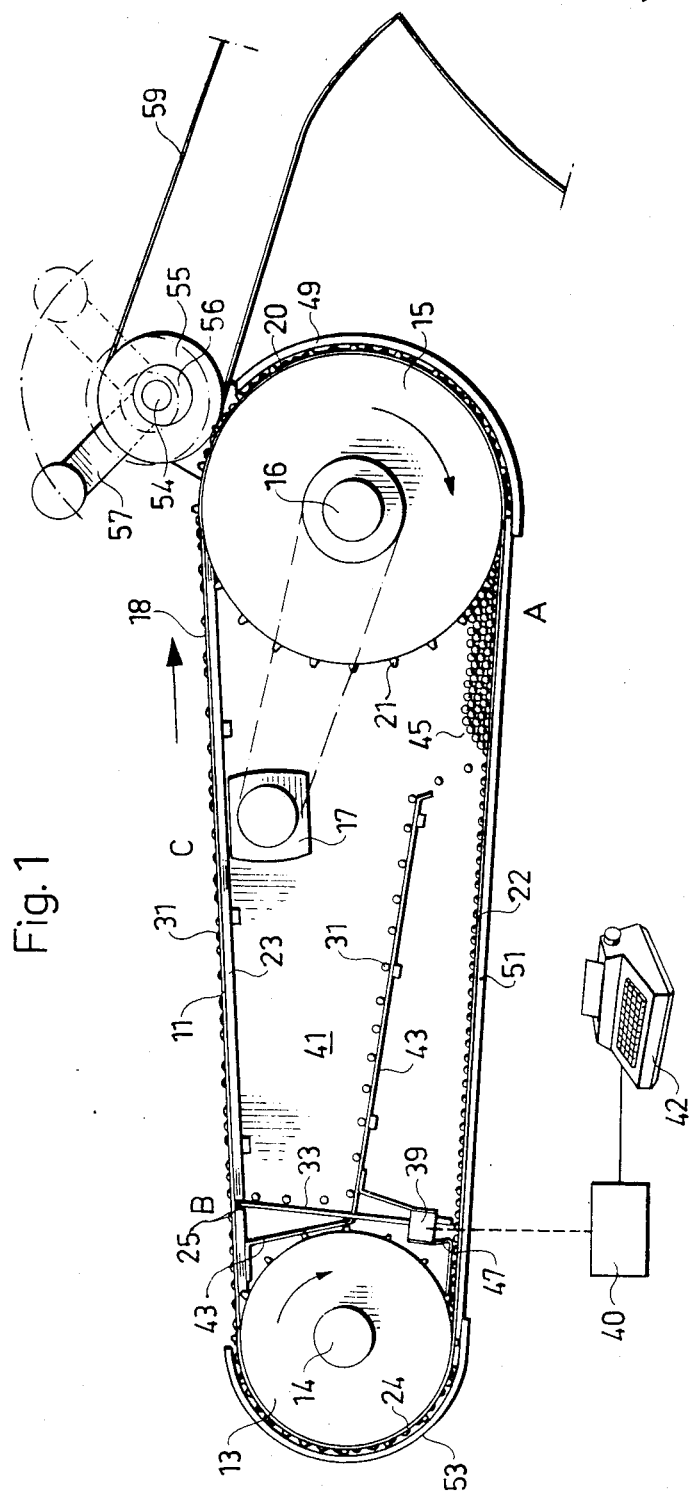
FIG. 1 shows the same as viewed from a vertical longitudinal plane.

In the drawings, an endless belt 11 is laid in a loop around two parallel rollers 13, 15 rotary about generally horizontal axes 14, 16, one of them driven by a motor 17 (or other powering means). The belt is moved in the direction of the arrow without slippage, perforation holes 19 at the edge of the belt engaging pegs 21 on the roller 15. The belt comprises an upper substantially horizontal or slightly inclined path 18, a semicircular path 20 around the roller 15, a lower substantially horizontal or preferably slightly upwardly inclined path 22 and a semicircular path 24 around the roller 13. Between the rollers 13, 15 the upper belt path 18 rests upon and is drawn in contact with an underlying support 23 in the shape of a table. Closely situated parallel grooves 27, 28 in the upper face of said table extend in the direction of travel of the belt 11.

The belt is perforated by a great number of small through holes 29 adapted to receive spherical balls 31 and of a slightly greater diameter than that of the balls. The holes are arranged in longitudinal and transverse rows and are dimensioned and spaced so as to form square groups corresponding to the Braille matrix system. The balls are made of steel, but some suitable plastic or ceramic material may be used instead. A preferred diameter of the balls is of the order of 1.6 mm, and the thickness of the belt 11 is of the order of 0.2 mm.

The belt holes are filled with balls at an area A of the lower path 22 of the belt loop, and after turning around the roller 13 the belt arrives at a second area B located close to the starting end of the upper run 18 of the belt.

At said area there are provided means for selectively removing some of the balls from positions within the belt holes. Said means form a sorting station, in which selected balls are allowed to drop out by the action of gravity. From there the belt passes towards and past an exposition area C, where the pattern of Braille symbols formed by the remaining balls of a group can be read off by a blind person using his finger tips.

The sorting station B is in principle arranged as a series of traps extending in a row transversely of the belt and each positioned below a longitudinal row of belt holes. Forming part of the sorting station is a slot 25 in the support 23, extending transversely thereof and having a dimension in the direction of travel of the belt somewhat greater than the diameter of the balls, so that balls can escape therethrough into the open space inside the belt loop.

To the sorting station B there also belongs a series of obstacles placed in said slot 25 and selectively displaceable so as to either block the passage of balls through the slot or allow the dropping of balls by gravity into the interior of the belt loop. In the shown embodiment said obstacles are formed by vertical bars 33 which extend upwardly into the slot 25, their upper flat end faces 35 being flush with the bottoms of the grooves 27, 28. Said bars 33 can be shifted sideways, i.e. in the direction of the slot 25, between an active position (shown at the right of FIG. 3) and an inactive position (shown at the left of FIG. 3). In the active position any bar end 35 forms a "bridge" which supports the balls of a corresponding longitudinal row of balls during their passage of the slot 25. In the active position the bars allow balls to pass through the slot and the thus downwardly opened escape way, as indicated by the line 37 and three intersecting circles in FIG. 3.

Figure 2:
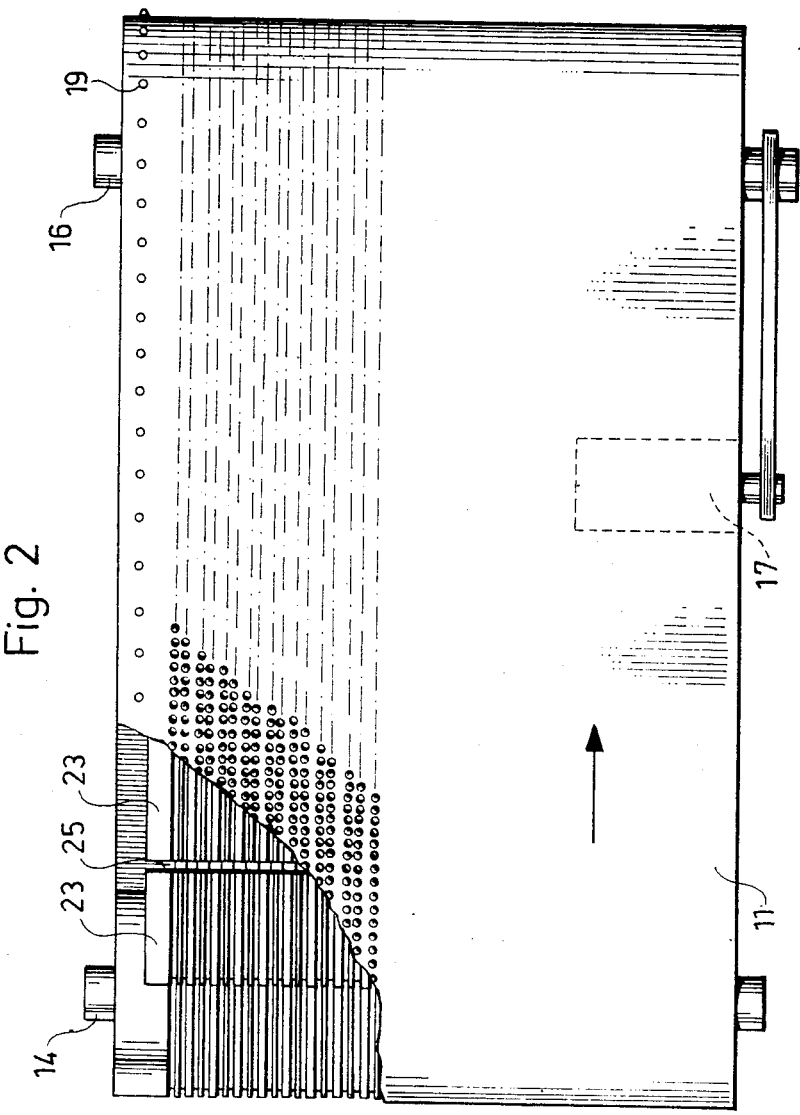
FIG. 2 is a view taken from above.
Figure 3:
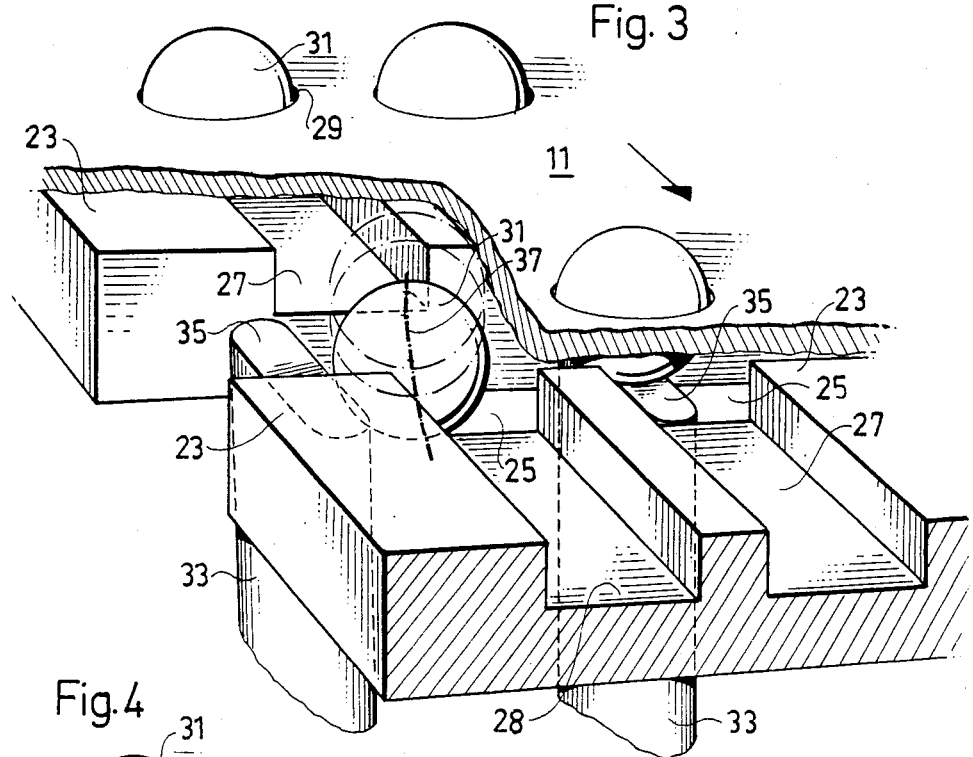
FIG. 3 is an enlarged perspective view of a fragment of the apparatus taken at an inclined angle from above.

In one embodiment shown in FIGS. 1 to 3 said bars 33 consist of ceramic material which due to the piezoelectric effect will bend under the influences of electric control impulses, their upper ends 35 moving in the slot 25, as explained, while their lower ends are rigidly attached. A control device 39 supplying said electric impulses to the bars is controlled by a computer 40 connected to a manually operable keyboard 42 or some other input means, such as a punched tape, a disk record or a data memory, supplying the text to be presented at C either in alpha-numeral form or in digital form. The computer transforms the characters of this information into Braille-code and serves it to the control device 39. The computer 40 also controls the motor 17 in order to synchronize the movement of the belt (either continuous or stepwise) with the operation of the bars. The speed of the belt can also be controlled manually.

The balls sorted-out drop down into a closed spaced bordered by the belt loop and two opposed end walls 41 of an enclosing cover. Beneath the sorting station B there is inserted a ball catching ramp 43 which diverts the rolling balls towards the roller 15. They are collected close to said roller to form a store 45 of balls resting upon the lower run 22 of the belt.

Said store supplies balls for refilling all empty holes of the belt. A possible excess of balls will be pushed back by a scraping means 47 before the belt turns around the roller 13 and starts a new turn.

The apparatus thus far described may be completed by printing means for transmitting the Braille-readable tactile perceptible ball configuration into permanent impressions in a web of sheet material. Said printing means comprises a roller 55 having an external surface of yieldable material, about which a web 59 of sheet material is looped. The axis 54 of said roller is journalled in eccentric bearings 56 which are turnable by means of a handle 57. By manipulating the same the roller can and will be shifted from an off-lying inoperative position into the shown active position, in which it presses the web against the balls extending through holes of the running belt.

Figure 4:
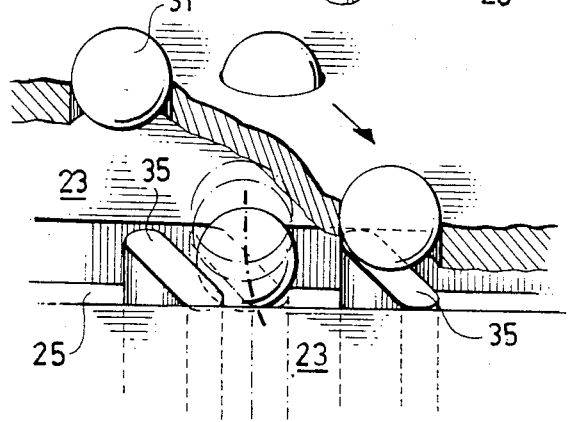
FIG. 4 shows a first modification of the details of FIG. 3.

In the modification of FIG. 4 the support table 23 has a completely flat upper face, i.e. it has no grooves as in FIG. 3. Here the belt consists of rubber and has a thickness of the order of 0.7 mm, i.e. it is approximately as thick as half the diameter of the balls, in order securely to retain them in the holes and to expose a part of the ball tops conveniently large for the tactile sensing of the Braille symbols.

Figure 5:
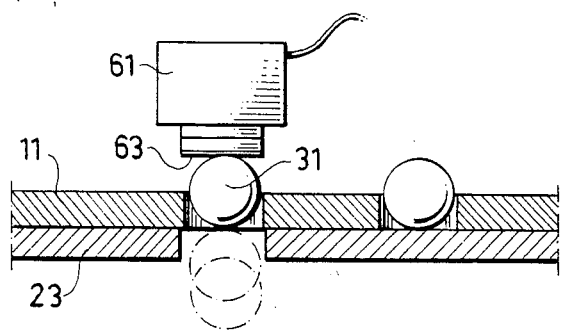
FIG. 5 shows a second modification thereof in vertical section.

FIG. 5 shows a further modification consisting in that the ball selection takes place by the use of magnetic forces. Above each longitudinal row of belt holes and opposite to the slot 25 of the support table 23 there is placed an electromagnet 61 in such a position that the balls 31 roll or slide along its pole shoe 63. When electric current is supplied to the electromagnet, the same keeps the ball attracted during its passage of the slot 25, thus preventing it from dropping therethrough. On the other hand, when the electromagnet is shut off, the gravity force prevails, and therefore the ball will drop freely through the slot 25.

At the exposition area C the ball patterns are presented as on a book page, several parallel rows of consecutive characters being shown simultaneously and readable in the transverse direction of the belt. According to a modification, the Braille characters may be read lengthwise of the belt, and in that a case a simplified version of the apparatus may comprise a belt having merely three longitudinal rows of holes.

From the above it is evident that an apparatus is created, by the use of which people with visual defects are given the possibility of taking part, at a desired moment, of literature recorded in other forms than by Braille code, and that other messages can be transmitted to them without significant delay otherwise than orally.

Of course, the above-described apparatus may be modified in several respects within the framework of the following claims.

What is claimed is:

1. Apparatus for producing raised dot formations, comprising a belt mounted for movement along a looped path, said belt forming an endless loop, said belt being perforated by a plurality of holes of predetermined and substantially equal size and each for receiving a ball therein, said path having an upper portion above another portion thereof and said upper portion having an underlying support means for supporting the said balls received in the said holes, said belt having an upper face and being of a smaller thickness than the diameter of said balls, said balls, when received in a respective said hole, having their uppermost parts extending above the upper face of said belt so as to be freely accessible for tactile perception, the apparatus further comprising means for filling empty holes with balls at a first area of the belt along said looped path, and means for selectively removing some of the balls from selected holes at another, second area along said looped path, said holes being dimensioned and grouped in a readable Braille dot matrix arrangement, said means for selectively removing balls comprising a sorting station having means for releasing selected balls in selected holes by allowing the balls to drop away from said belt under the action of gravity and to collect said released balls in said first area, said sorting station comprising a downwardly directed, selectively blockable escape in the shape of a slot formed in said belt support means and having a horizontal dimension in the direction of travel of the belt significantly greater than the diameter of a ball, a plurality of obstacles being disposed in said slot and each being selectively displaceable to either block or allow the dropping of a ball through said slot, said obstacles comprising piezoelectric bars fastened at one end and bendable under the influence of electric control signals controlled by a computer.

2. Apparatus as recited in claim 1 characterised in that said ball selectively removing means comprises a plurality of electromagnets located above said looped path and positioned to, when energized, hold a ball in a belt hole means in which it is disposed so that the ball will not drop out of said belt hole, means and when de-energized not providing a ball holding action.

3. Apparatus as recited in claim 1, characterised in that beneath said sorting station there are provided ball catching ramp means for directing balls towards the another portion of said path of the belt to form a store of balls thereupon, from which empty belt holes are refillable.

4. Apparatus as recited in claim 1, characterised by the provision of printing means for transmitting the Braille-readable tactile perceptible ball configuration into permanent impressions in a web of sheet material.

5. Apparatus as recited in claim 4, characterised in that said printing means comprises a roller having an external surface of yieldable material, about which the web is looped, means being provided for selectively moving said roller into a position pressing against balls extending through holes of the running belt.

6. Apparatus for producing raised dot formations comprising:
  a belt, having a selected thickness and forming an endless loop, said belt being perforated by a plurality of holes of a selected size and each for receiving a ball therein, said holes being dimensioned and grouped in a readable dot matrix system;
  means for mounting belt for movement in a looped path;
  a plurality of balls for receipt by said belt holes, each ball having a diameter which is greater than the thickness of the belt and so that a portion of a ball extending into a hole in the belt will have a portion extending outwardly from the belt;
  means for supplying said balls to said belt at a first area thereof along its looped path, for disposition in said holes; and
  means for selectively removing some of the balls from positions within belt holes at another, second area along said looped path, said selectively removing means comprising a sorting station comprising means for releasing selected balls in belt holes by allowing the balls to drop away from said belt under the action of gravity, said apparatus further comprising a substantially horizontally extending support disposed beneath a top section of said belt in said looped path, adjacent said second area, and wherein said sorting station comprises a selectively blockable slot having a horizontal dimension significantly greater than the diameter of a ball, and formed in said substantially horizontal support; an exposition station formed between said sorting station and said first roller, by said substantially horizontal support, at which station balls selectively disposed in holes in said belt are freely accessible for tactile perception, printing means being disposed between said exposition station and said first area of said looped path for producing permanent raised dot matrix impressions in sheet material, said apparatus further comprising a plurality of obstacles disposed beneath said slot to either block, or allow, the dropping of a bail through said slot at a predetermined hole in said belt, and control means for controlling selective movement of said obstacles between said blocking, and dropping-allowing, positions; said obstacles comprising piezoelectric rods fastened at one end thereof, and bendable under the influence of electrical control signals controlled by a computer.

7. Apparatus as recited in claim 6 wherein said means for mounting said belt comprises first and second rollers, each rotatable about a generally horizontal axis, said roller axes being parallel.

8. Apparatus as recited in claim 7 wherein said roller axes are disposed with respect to each other so that said first area of said looped path and said second area of said looped path are both generally horizontal.

9. Apparatus as recited in claim 6 further comprising, at said sorting station, a plurality of electromagnets located above said looped path and positioned to, when energized, hold a ball in a belt hole in which it is disposed so that said ball will not drop out of said belt hole, and when de-energized not providing a ball holding action.

* * * * *